United States Patent
Shaw et al.

(10) Patent No.: US 11,397,589 B2
(45) Date of Patent: Jul. 26, 2022

(54) SNAPSHOT TRANSMISSION FROM STORAGE ARRAY TO CLOUD USING MULTI-PATH INPUT-OUTPUT

(71) Applicant: EMC IP Holding Company LLC, Hopkinton, MA (US)

(72) Inventors: Rabi Shankar Shaw, Bangalore (IN); Anurag Bhatnagar, Bangalore (IN); Sarat Kumar Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 16/811,751

(22) Filed: Mar. 6, 2020

(65) Prior Publication Data
US 2021/0279070 A1    Sep. 9, 2021

(51) Int. Cl.
*G06F 3/06*    (2006.01)
*G06F 9/4401*   (2018.01)
(Continued)

(52) U.S. Cl.
CPC .......... *G06F 9/4411* (2013.01); *G06F 9/3009* (2013.01); *G06F 9/3889* (2013.01);
(Continued)

(58) Field of Classification Search
None
See application file for complete search history.

(56) References Cited

U.S. PATENT DOCUMENTS

| 6,567,397 B1 | 5/2003 | Campana et al. |
| 6,628,649 B1 * | 9/2003 | Raj .......... H04L 45/586 370/360 |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Hyun Nam
(74) *Attorney, Agent, or Firm* — Ryan, Mason & Lewis, LLP

(57) ABSTRACT

A processing device is configured to communicate over a network with a storage system comprising a plurality of storage devices. The device comprises a multi-path input-output (MPIO) driver configured to control delivery of input-output (IO) operations from the device to the storage system over selected ones of a plurality of paths through the network. The paths are associated with respective initiator-target pairs, and each of a plurality of targets of the initiator-target pairs comprises a corresponding port of the storage system. The MPIO driver is further configured to create a plurality of IO operation threads, to use a given IO operation thread to retrieve a given IO operation from an IO queue, to attempt to perform the given IO operation on a given target of the plurality of targets, and to return the given IO operation to the IO queue upon a failure to perform the given IO operation.

20 Claims, 8 Drawing Sheets

(51) Int. Cl.
  *G06F 9/38*     (2018.01)
  *G06F 9/30*     (2018.01)
  *G06F 16/182*   (2019.01)
  *G06F 9/54*     (2006.01)
  *G06F 16/11*    (2019.01)

(52) U.S. Cl.
  CPC .............. *G06F 9/542* (2013.01); *G06F 9/546* (2013.01); *G06F 16/128* (2019.01); *G06F 16/1824* (2019.01)

(56) References Cited

U.S. PATENT DOCUMENTS

| | | |
|---|---|---|
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1* | 2/2010 | Nagineni ................ H04L 69/40 710/36 |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,718,797 B1* | 5/2014 | Addepalli ........... H04L 61/2592 700/83 |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0069278 A1* | 6/2002 | Forslow .............. H04L 63/0272 709/225 |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0085500 A1* | 3/2017 | Patney .................. H04W 80/06 |
| 2017/0187629 A1* | 6/2017 | Shalev .................. H04L 47/125 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2020/0097203 A1* | 3/2020 | Mallick ................. G06F 13/102 |
| 2020/0106698 A1* | 4/2020 | Rao ........................ H04L 49/356 |
| 2021/0279070 A1* | 9/2021 | Shaw .................... G06F 9/4411 |
| 2021/0334010 A1* | 10/2021 | Charles ............... G06F 11/1423 |
| 2022/0121535 A1* | 4/2022 | Bhatnagar ........... G06F 11/1451 |
| 2022/0137830 A1* | 5/2022 | Garrett, Jr. ............ G06F 3/0683 714/6.2 |
| 2022/0137845 A1* | 5/2022 | Crowley ........... H04L 2101/622 710/38 |
| 2022/0141131 A1* | 5/2022 | Rajamanickam ....... H04L 45/70 370/252 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. filed Oct. 27, 2017, and entitled "Storage System with Network-Wide Configurable Device Names."

U.S. Appl. No. 16/142,274 filed in the name of Sanjib Mallick et al. filed Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. filed Sep. 28, 2018, and entitled "Host Device with Multi-Path Layer Implementing Path Selection Based At Least In Part on Fabric Identifiers."

U.S. Appl. No. 16/155,429 filed in the name of Rimpesh Patel et al. filed Oct. 9, 2018, and entitled "Categorizing Host IO Load Pattern and Communicating Categorization to Storage System."

U.S. Appl. No. 16/155,491 filed in the name of Kundan Kumar et al. filed Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit PundalikAnchi et al. filed Dec. 11, 2019, and entitled "Automated Seamless Migration with Signature Issue Resolution."

Dell EMC, "Dell EMC Unity: Cloud Tiering Appliance (CTA)," Technical White Paper, Mar. 2019, 32 pages.

C. Taylor, "What is iSCSI and How Does It Work?" https://www.enterprisestorageforum.com/storage-hardware/iscsi.html, May 23, 2019, 6 pages.

(56) References Cited

OTHER PUBLICATIONS

Netapp, Inc. "What SnapDiff Is," https://library.netapp.com/ecmdocs/ECMP1196874/html/GUID-C2793E0D-0AB5-40FD-9F36-324F3178FF6F.html, Mar. 2, 2020, 2 pages.

* cited by examiner iSCSI Interfaces

| ID | Ethernet Port | SP | Link Status | IP Address | Subnet Mask | Gateway | IQN | IQN Alias |
|---|---|---|---|---|---|---|---|---|
| If_134 | IO Module 0... | SPA | Link Up | 12.345.67.890 | 123.345.678.0 | 0.123.45.6 | iqn.abcde... | abcda2 |
| If_142 | IO Module 0... | SPA | Link Up | 12.345.67.891 | 123.345.678.0 | 0.123.45.6 | iqn.abcde... | abcda3 |

300

FIG. 3 iSCSI Targets

Server FQDN: unity123.sample.local

400

| Path | IQN | IP | SP | Port | Link Status |
|---|---|---|---|---|---|
| X | iqn.abcde.com.xyz:pq.rst123456789.a2 | 12.345.67.890 | SPA | 3260 | True |
| X | iqn.abcde.com.xyz:pq.rst123456789.a3 | 12.345.67.891 | SPA | 3260 | True |

FIG. 4

SNAPSHOT TRANSMISSION FROM STORAGE ARRAY TO CLOUD USING MULTI-PATH INPUT-OUTPUT

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. Some conventional techniques do not adequately use available storage targets to perform the IO operations, which decreases fault tolerance. For example, block archiving or restoring processes are performed over a single storage target, even though multiple storage targets are available.

The current approaches do not allow for adequate utilization of other available targets and other available IO paths in the event of failure of a selected target and/or path. For example, if a designated target fails during a task, the task fails. In addition, a chosen target may be overloaded and result in slow or inefficient data transfer even though alternative targets carrying less load are available.

Task failures and delays caused by limiting IO operations to single targets can adversely impact important functions of the host devices, such as read or write operations in connection with archiving, leading to sub-optimal performance.

SUMMARY

Illustrative embodiments configure a multi-path layer of one or more processing devices to include functionality for using multiple storage targets to execute threads for reading and writing snapshots in block archiving or restoring processes. The multi-path layer illustratively comprises at least one multi-path input-output (MPIO) driver configured to process IO operations of a host device and/or of a cloud tiering appliance (CTA). For example, in one or more embodiments, a CTA logs in to multiple storage targets and performs IO operations using the multiple targets. If a storage target fails during an IO operation, the IO operation will be performed using another available target. Configuring MPIO drivers of multiple host devices and/or CTAs to implement the use of multiple storage targets to execute threads for reading and writing snapshots in block archiving or restoring processes as disclosed herein can ensure that task failures and delays caused by limiting IO operations to single targets are avoided, leading to enhanced overall system performance.

In one embodiment, an apparatus comprises a processing device comprising a processor coupled to a memory. The processing device is configured to communicate over a network with a storage system comprising a plurality of storage devices. The processing device comprises an MPIO driver configured to control delivery of IO operations from the processing device to the storage system over selected ones of a plurality of paths through the network, where the paths are associated with respective initiator-target pairs, and each of a plurality of targets of the initiator-target pairs comprises a corresponding port of the storage system. The MPIO driver is further configured to create a plurality of IO operation threads, to use a given IO operation thread of the plurality of IO operation threads to retrieve a given IO operation from an IO queue, to attempt to perform the given IO operation on a given target of the plurality of targets, and to return the given IO operation to the IO queue upon a failure to perform the given IO operation.

These and other illustrative embodiments include, without limitation, apparatus, systems, methods and computer program products comprising processor-readable storage media.

BRIEF DESCRIPTION OF THE DRAWINGS

FIG. 3 shows a table on a user interface including details of transport layer protocol interfaces associated with a storage array in an illustrative embodiment.

FIG. 4 shows a user interface depicting selection and details of storage targets prior to an IO operation in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
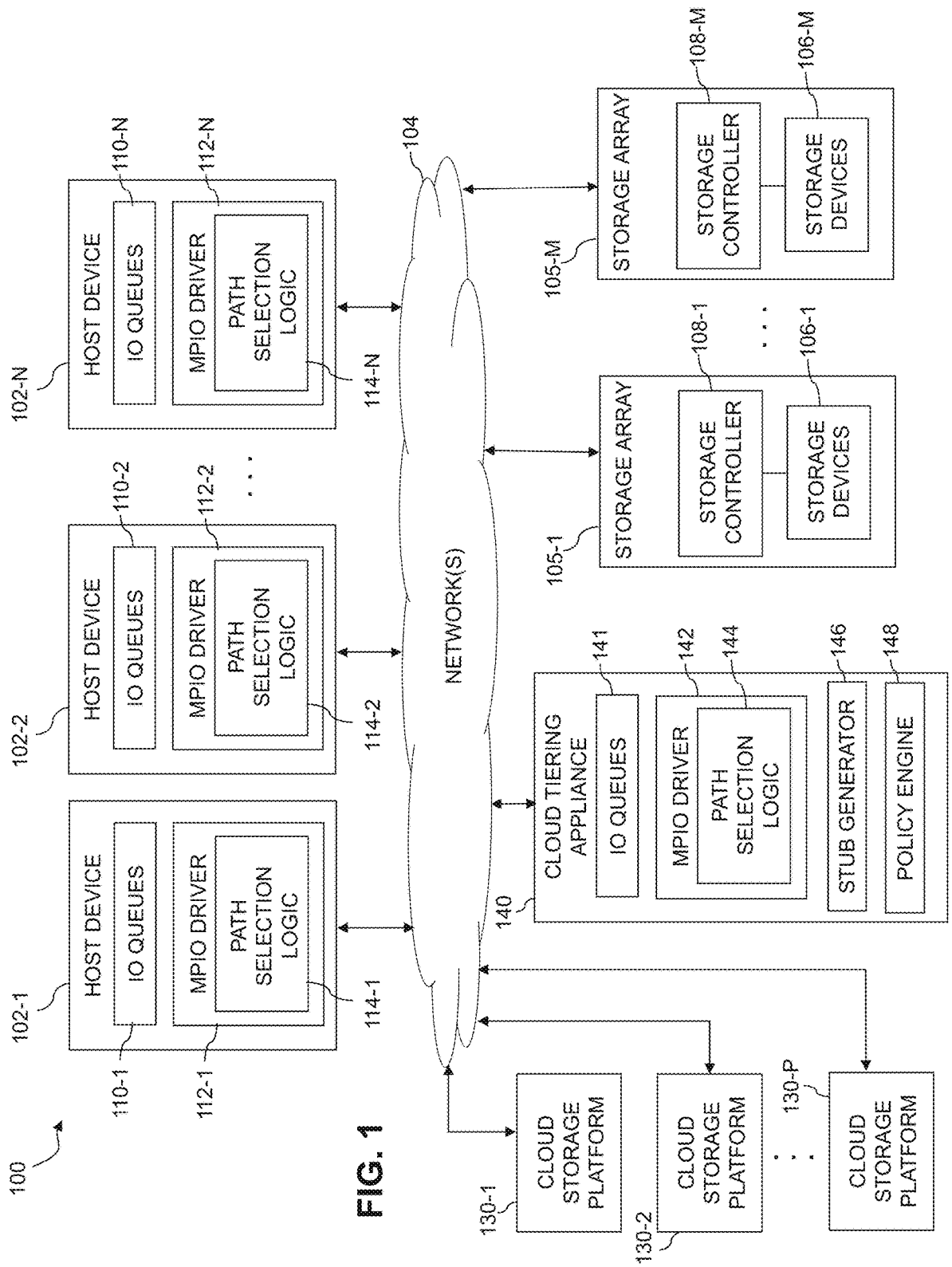
FIG. 1 is a block diagram of an information processing system configured with functionality for using multiple storage targets to execute threads for reading and writing snapshots utilizing a multi-path layer in an illustrative embodiment.

FIG. 1 shows an information processing system 100 configured in accordance with an illustrative embodiment. The information processing system 100 comprises a plurality of host devices 102-1, 102-2, . . . 102-N, collectively referred to herein as host devices 102. The host devices 102 communicate over a network 104 with a plurality of storage arrays 105-1, . . . 105-M, collectively referred to herein as storage arrays 105, and with a CTA 140. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The host devices 102 illustratively comprise respective computers, servers or other types of processing devices configured to communicate with the storage arrays 105 and the CTA 140 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The CTA 140 of the system 100 is configured to move data between the storage arrays 105 and one or more cloud storage platforms 130-1, 130-2, . . . 130-P, collectively referred to herein as cloud storage platforms 130. The CTA 140 is configured to move data, for example, by moving data files, snapshots or other data objects between the storage arrays 105 and the cloud storage platforms 130. A given data object may comprise a single data file, or multiple data files. The CTA 140 permits administrators to automatically move data from the storage arrays 105 to and from the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The CTA 140 in some embodiments comprises configurable data mover modules adapted to interact with the storage arrays 105 and the cloud storage platforms 130. At least one configuration file is implemented in or otherwise associated with the CTA 140. The state of the configuration file may be controlled at least in part by a job scheduler implemented as part of the CTA 140. The job scheduler interacts with a data movement policy engine 148 that is also part of the CTA 140 in this embodiment. In other embodiments, at least one of the job scheduler and the policy engine 148 may be implemented at least in part externally to the CTA 140.

The CTA 140 can include at least one application programming interface (API) that permits an external component to control selection between various modes of operation. For example, the above-noted job scheduler can access the configuration file via such an API in order to control a mode of operation of the CTA 140. Additionally or alternatively, an application running on one or more of the host devices 102 can access the configuration file via the API in order to control the mode of operation of the CTA 140.

In some embodiments, the CTA 140 is configurable via the configuration file in a mode of operation in which a particular type of data movement between the storage arrays 105 and the cloud storage platforms 130 occurs for a given data object being utilized by an application running on one or more of the host devices 102. Furthermore, other embodiments can configure the CTA 140 in different modes of operation without the use of a configuration file. Thus, such a configuration file should not be viewed as a requirement.

The CTA 140 is illustratively coupled to the network 104 and configured to control transfer of data between the storage arrays 105 and the cloud storage platforms 130. The term "data movement" as used in this and other contexts herein is intended to be broadly construed, so as to encompass data relocation as well as other types of movement of data between the storage arrays 105 and the cloud storage platforms 130. A given data mover module can be implemented at least in part on storage arrays 105 or other storage platforms that implement at least portions of one or more storage tiers of the multi-tier storage system.

In the FIG. 1 embodiment, the CTA 140 comprises a stub generator 146 and the policy engine 148. Such components are illustratively implemented at least in part in the form of software running on a processing platform or processing device that implements the CTA 140. The CTA 140 itself may be implemented in one or more containers of the processing platform, or using other arrangements of physical or virtual processing devices.

In one or more embodiments, the CTA 140 can be used to tier file data and archive block data to the cloud storage platforms 130, and to recall file data and restore block data to the storage arrays 105 from the cloud storage platforms 130. In some embodiments, the CTA 140 can be used to migrate repositories between cloud storage platforms 130.

In a file tiering process (also referred to herein as "cloud tiering"), the policy engine 148 is configured to identify files that fit an administrator-defined criteria, and the CTA 140 initiates movement of the identified files to a cloud storage platform 130. The stub generator 146 places a stub file in the original file location on the storage array 105. According to an embodiment, when a user reads the stub, the CTA 140 recalls or passes the IO through the original file located in the cloud storage platform 130, and to the user, the file appears to be in its original location on a storage array 105.

In a block archiving process, the policy engine 148 identifies block snapshots that fit an administrator-defined criteria, and the CTA 140 initiates archiving of the identified snapshots to a cloud storage platform 130, leaving the identified snapshots in the storage arrays 105. After the identified snapshots are backed up to one or more of the cloud storage platforms 130, the original snapshots can be erased from the storage arrays 105 to free space. Users may initiate restoring of one or more snapshots to one or more of the storage arrays 105 via, for example, a host device 102.

According to an embodiment, the policy engine 148 scans the snapshots and applies policy rules to each snapshot. If there are multiple rules in a policy, the policy engine 148 applies the rules to a given snapshot until a rule evaluates to "true," and then takes the action associated with the rule, such as, for example, "archive" or "don't archive."

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one storage area network (SAN), the storage arrays 105 may be viewed as part of the one or more SANs.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, the storage arrays 105 illustratively comprise one or more VNX®, VMAX®, Unity™ or PowerMax™ storage arrays, commercially available from Dell EMC of Hopkinton, Mass.

As another example, the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 or CTA 140 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon® Web Services (AWS®) system. Other examples of cloud-based systems that can be used to provide at least portions of the storage arrays 105 and possibly other portions of system 100 include Dell® EMC® ECS, Google® Cloud Platform (GCP®) and Microsoft® Azure®.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system." Other embodiments can include only a single host device, possibly configured to have exclusive use of the storage system. The storage devices 106 of the storage arrays 105 implement logical units (LUNs) configured to store objects for users associated with the host devices 102. These objects can comprise files, blocks or other types of objects.

The host devices 102 and the CTA 140 interact with the storage arrays 105 utilizing read and write commands as well as other types of commands that are transmitted over the network 104. In some embodiments, the host devices 102 interact with the storage arrays 105 via the CTA 140. In other embodiments, the host devices 102 interact directly with the storage arrays 105. Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of the storage arrays 105.

Each IO operation is assumed to comprise one or more commands for instructing the storage arrays 105 to perform particular types of storage-related functions such as reading data from or writing data to particular logical storage volumes or other logical storage devices of the storage arrays 105. Such commands are assumed to have various payload sizes associated therewith, and the payload associated with a given command is referred to herein as its "command payload."

A command directed by the host device 102-1 or CTA 140 to a storage array 105 is considered an "outstanding" command until such time as its execution is completed in the viewpoint of the host device 102-1 or CTA 140, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in a storage array 105 to include different portions of one or more physical storage devices. The storage devices 106 may therefore be viewed as comprising respective LUNs or other logical storage volumes. Logical storage devices are also referred to herein as simply "logical devices."

Each of the host devices 102 and the CTA 140 illustratively have multiple paths to the storage arrays 105 via the network 104, with at least one of the storage devices 106 of a storage array 105 being visible to that host device or CTA 140 on a given one of the paths, although numerous other arrangements are possible. A given one of the storage devices 106 may be accessible to a given host device or CTA 140 over multiple paths. Different ones of the host devices 102 or the CTA 140 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102 or CTA 140.

The host devices 102, network 104, storage arrays 105, cloud storage platforms 130 and CTA 140 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102, the storage arrays 105, cloud storage platforms 130 and CTA 140 may be implemented on respective distinct processing platforms, although numerous other arrangements are possible. For example, in some embodiments at least portions of host devices 102, the storage arrays 105, cloud storage platforms 130 and CTA 140 are implemented on the same processing platform. The storage arrays 105 can therefore be implemented at least in part within at least one processing platform that implements at least a subset of the host devices 102, cloud storage platforms 130 and CTA 140.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105 and/or CTA 140. The storage arrays 105 and the CTA 140 can be similarly distributed across multiple data centers.

Although in some embodiments certain commands used by the host devices 102 and/or CTA 140 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

In accordance with one or more embodiments, in order to configure block archiving or restoring processes, multiple interfaces are added for one or more of the storage arrays 105. For example, referring to FIG. 3, a table 300 may appear on a user interface of a host device 102 visible to an administrator. The table 300 illustrates details of transport layer protocol interfaces (e.g., iSCSI interfaces) associated with a storage array 105. The details include, for example, IDs, Ethernet ports, network management port (SP), link status, IP address, subnet mask number, gateway, iSCSI qualified name (IQN) and IQN alias.

In addition, targets (e.g., iSCSI targets) in one or more of the storage arrays 105 are selected. A target comprises a port or other targeted entity corresponding to one or more of the storage devices 106 of one or more of the storage arrays 105. For MPIO, more than one target must be selected so that MPIO can provide fault tolerance and performance. MPIO features will not work if only a single target for a storage array is used. If that single target fails, the task will fail, and there will not be any fault tolerance.

Referring to FIG. 4, targets that will be used in an MPIO process by, for example, the CTA 140 or a host device 102, can be manually selected via a user interface 400 appearing on the host device 102. The user interface 400 allows for target selection so that a device running an MPIO operation (e.g., CTA 140 or host device 102) knows which targets to use during the MPIO operation. The user interface 400 in FIG. 4 (e.g., a graphical user interface (GUI)) includes, for example, an interactive option for selection of the targets (in this case a box that can be checked or unchecked), and information including, but not necessarily limited to IQN, IP address, network management port (SP), device port (Port) and link status for each target. As can be seen in FIG. 4, two targets have been selected corresponding to a server having a fully qualified domain name (FQDN) of unity123.sample.local. According to one or more embodiments, the user interface 400 may further include an option to select the cloud repository (e.g., Dell® EMC® ECS, Microsoft® Azure®, etc.) that will be used as the cloud storage platform 130.

It is assumed that the CTA 140 comprises block archiving/restoring control logic and that the storage controllers 108 of the storage arrays 105 each comprise a snapshot generator. The block archiving/restoring control logic controls performance of the above-noted block archiving or restoring processes. The snapshot generator can be used, for example, to generate block snapshots of one or more storage volumes that are subject to back-up operations to one or more cloud storage platforms 130 in conjunction with a wide variety of different block archiving scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for archiving in the system 100 may comprise a set of one or more LUNs or other storage volumes of at least one of the storage arrays 105. Each such LUN or other storage volume is assumed to comprise at least a portion of a physical storage space of one or more of the storage devices 106 of the storage arrays 105.

The host devices 102 comprise respective sets of IO queues 110-1, 110-2, . . . 110-N and respective MPIO drivers 112-1, 112-2, . . . 112-N. In addition or alternatively, the CTA 140 comprises IO queues 141 and an MPIO driver 142. The MPIO drivers 112 collectively comprise a multi-path layer of the host devices 102, and the MPIO driver 142 comprises a multi-path layer of the CTA 140. The multi-path layer provides functionality for using multiple storage targets to execute threads for reading and writing snapshots in block archiving or restoring processes. Such functionality is provided at least in part using respective instances of path selection logic 114-1, 114-2, . . . 114-N implemented within the MPIO drivers 112 or path selection logic 144 implemented within MPIO driver 142.

The MPIO drivers 112 and 142 may comprise, for example, otherwise conventional MPIO drivers, such as PowerPath® drivers from Dell EMC, suitably modified in the manner disclosed herein to provide functionality for using multiple storage targets to execute threads for reading and writing snapshots in block archiving or restoring processes. Other types of MPIO drivers from other driver vendors may be suitably modified to incorporate functionality for using multiple storage targets to execute threads for reading and writing snapshots in block archiving or restoring processes as disclosed herein.

The MPIO driver 112-1 or MPIO driver 142 is configured to select IO operations from its corresponding set of IO queues 110-1 or 141 for delivery to one or more of the storage arrays 105 over the network 104. The sources of the IO operations stored in the set of IO queues 110-1 illustratively include respective processes of one or more applications executing on the host device 102-1. The sources of the IO operations stored in the set of IO queues 141 illustratively include respective processes of one or more applications executing on one or more of the host devices 102. Other types of sources of IO operations may be present in a given implementation of system 100.

The paths over which the IO operations are sent from the host device 102-1 or the CTA 140 to the storage arrays 105 illustratively comprise paths associated with respective initiator-target pairs, with each initiator comprising a bus adaptor (BA) or other initiating entity of the host device 102-1 or CTA 140 and each target, as noted above, comprising a port or other targeted entity corresponding to one or more of the storage devices 106 of one or more of the storage arrays 105. As noted above, the storage devices 106 illustratively comprise LUNs or other types of logical storage devices, and the targets can be manually selected by a user when configuring, for example, the CTA 140.

In selecting particular ones of the paths for delivery of the IO operations to the storage arrays 105, the path selection logic 114-1 of the MPIO driver 112-1 or the path selection logic 144 of the MPIO driver 142 illustratively implements a path selection algorithm that selects particular ones of the paths at least in part as a function of path information such as device BA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 or 141 is more generally referred to herein as "path selection." Path selection as that term is broadly used herein can in some cases involve both selection of a particular IO operation and selection of one of multiple possible paths for accessing a corresponding logical device of a storage array 105. The corresponding logical device illustratively comprises a LUN or other logical storage volume to which the particular IO operation is directed.

A given retry of a failed IO operation under such a path selection algorithm can select a path having a different device BA and storage array port for a given retry than that of the path selected for the original failed IO operation. Examples of implementation of MPIO operations and path selection algorithms are described further in connection with FIGS. 2 and 5-8.

The paths between the host devices 102 and one or more of the storage arrays 105, or between the CTA 140 and one or more of the storage arrays 105 can change over time. For example, the addition of one or more new paths from host device 102-1 or the CTA 140 to one or more of the storage arrays 105 or the deletion of one or more existing paths from the host device 102-1 or the CTA 140 to one or more of the storage arrays 105 may result from respective addition or deletion of at least a portion of the storage devices 106 of one or more of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation. In these and other situations, path discovery scans may be repeated as needed in order to discover the addition of new paths or the deletion of existing paths.

For example, a storage system may include first and second storage arrays, with data being migrated from the first storage array to the second storage array prior to removing the first storage array from the storage system. In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array so as to be available for data recovery in the event of a failure involving the production storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

A given path discovery scan can be performed utilizing known functionality of conventional MPIO drivers, such as PowerPath® drivers. These and other references to Power-Path® herein are presented by way of illustrative example only, and should not be construed as limiting in any way.

The path discovery scan in some embodiments may be further configured to identify one or more new LUNs or other logical storage volumes associated with the one or more new paths identified in the path discovery scan, as well as the identification of targets of the storage arrays 105. The path discovery scan may comprise, for example, one or more bus scans which are configured to discover the appearance of any new LUNs that have been added to one or more of the storage arrays 105 as well to discover the disappearance of any existing LUNs that have been deleted from one or more of the storage arrays 105.

The MPIO driver 112-1 or MPIO driver 142 in some embodiments comprises a user-space portion and a kernel-space portion. The kernel-space portion of the MPIO driver 112-1 or 142 may be configured to detect one or more path changes of the type mentioned above, and to instruct the user-space portion of the MPIO driver 112-1 or 142 to run a path discovery scan responsive to the detected path changes. Other divisions of functionality between the user-space portion and the kernel-space portion of the MPIO driver 112-1 or 142 are possible.

For each of one or more new paths identified in the path discovery scan, the host device 102-1 or CTA 140 may be configured to execute a registration operation for that path. The registration operation for a given new path illustratively provides notification to one or more of the storage arrays 105 that the host device 102-1 or CTA 140 has discovered the new path.

Figure 2:
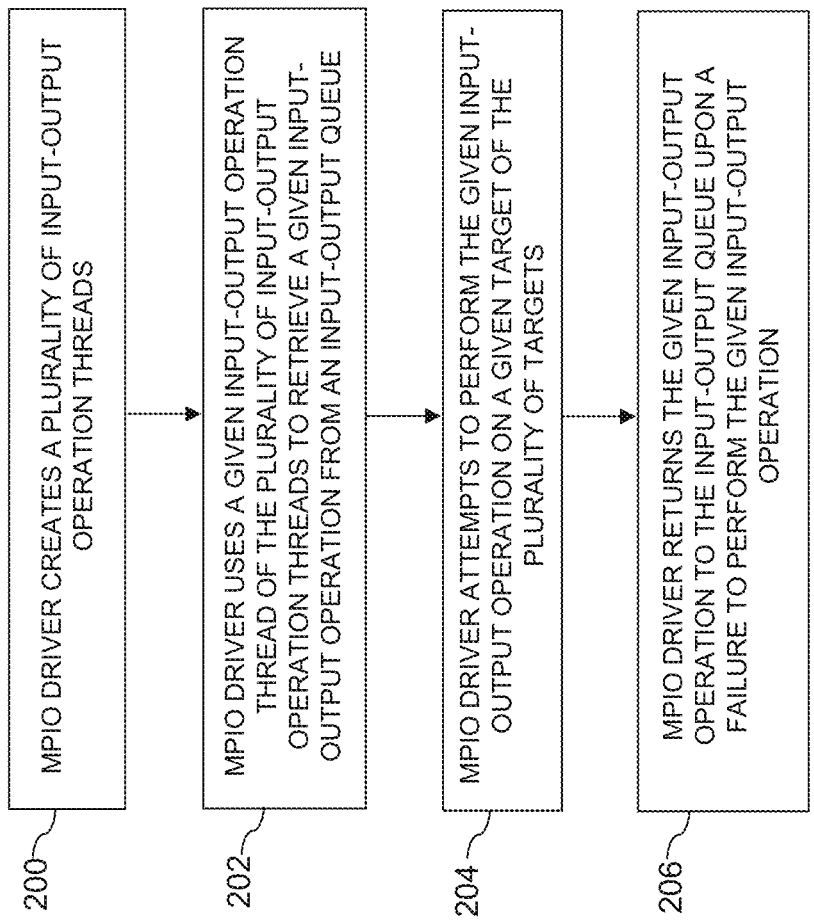
FIG. 2 is a flow diagram of a process for using multiple storage targets to execute threads for reading and writing snapshots utilizing a multi-path layer in an illustrative embodiment.
Figure 5:
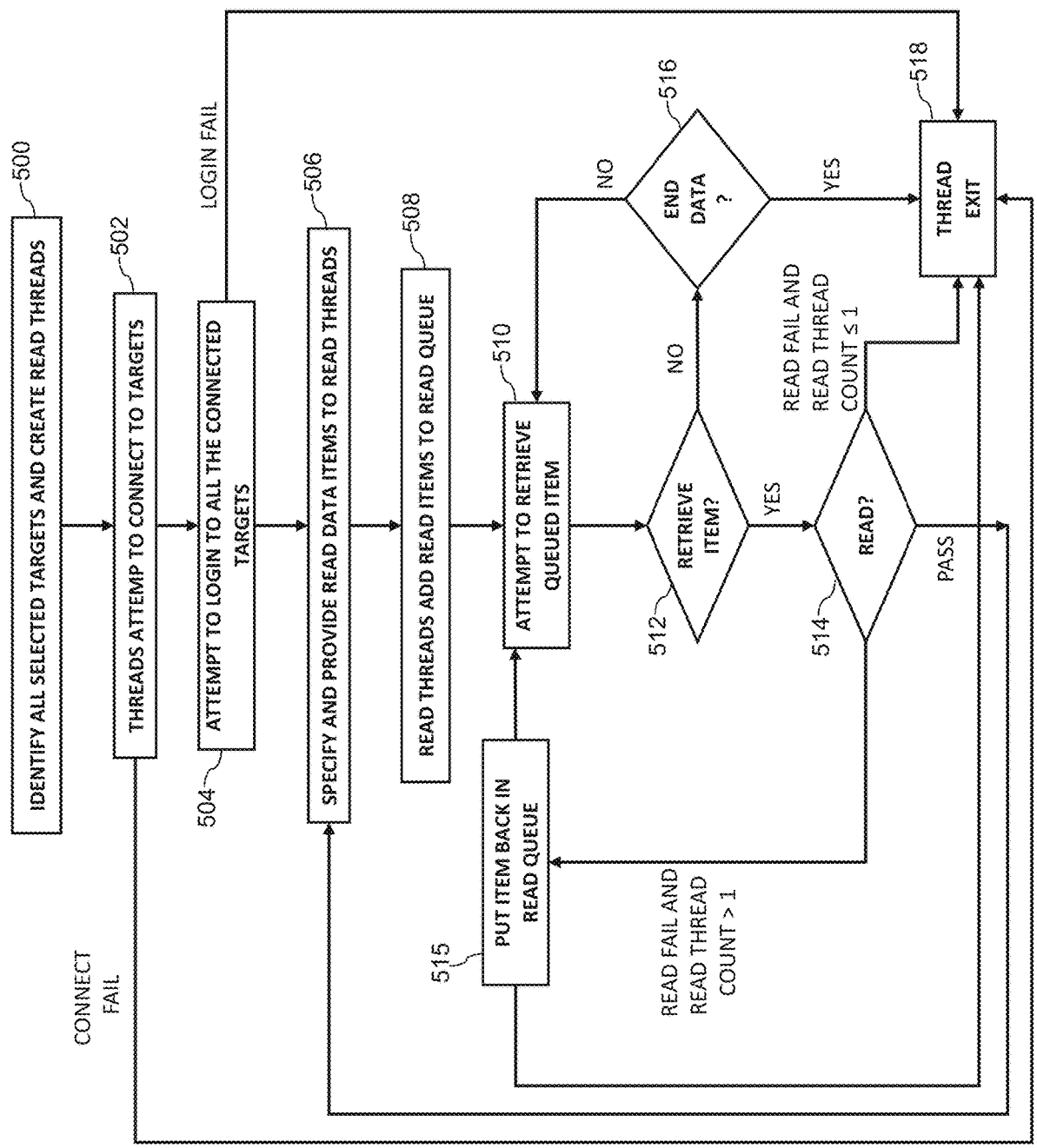
FIG. 5 is a flow diagram of a multi-path read operation in an illustrative embodiment.
Figure 6:
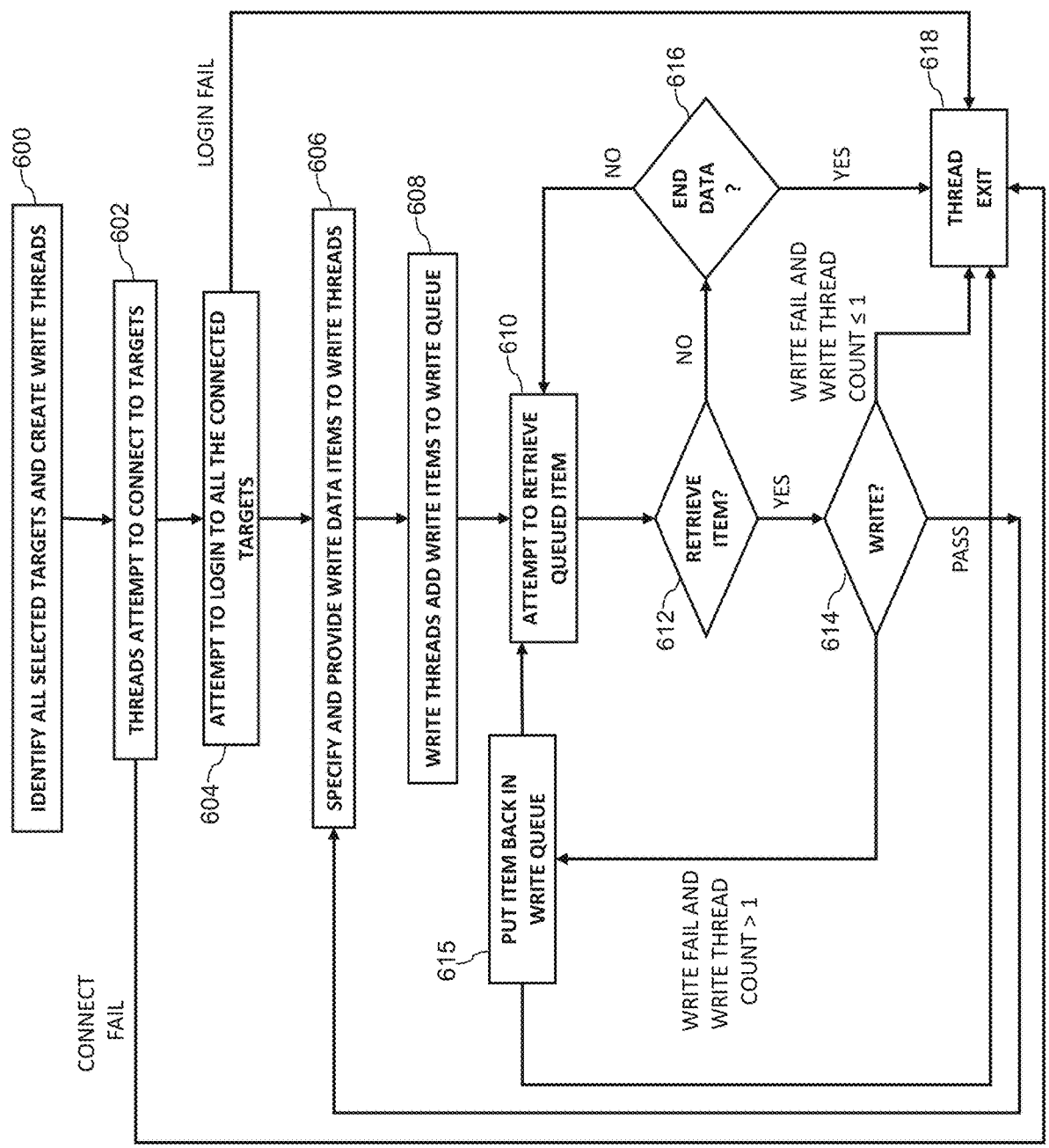
FIG. 6 is a flow diagram of a multi-path write operation in an illustrative embodiment.

As described further in connection with FIGS. 2, 5 and 6, the MPIO driver 112-1 or 142 is further configured to obtain information that an IO operation in connection with a given read or write thread has failed, and to return an IO data chunk to one of the IO queues 110-1 or 141 for another read or write thread to retry the read or write operation on another target, providing fault tolerance based at least in part on the obtained information. The other read or write thread and other target are utilized in path selection operations performed by the path selection logic 114-1 or 144. The information that an IO operation in connection with a given read or write thread has failed may be obtained from one or more of the storage arrays 105 and processed by the host device 102-1 or the CTA 140. For example, paths to the target corresponding to the failed IO operation are illustratively excluded from consideration by a path selection algorithm, as the corresponding target is identified with a failed status, until such time as a read or write task completes and the status of those paths changes to available based on a detected clearing of the corresponding target failure. For example if during a read or write task (e.g., archive to cloud storage or restore from cloud storage), a given target fails and is restored before the end of the task, the given target will not be used again until that task is completed. In other words, according to an embodiment, no new or restored targets are added during a read or write task. A task may be deemed complete after a successful read or write operation, or after attempting to perform a read or write operation ends.

Although the targets illustratively comprise respective ports of the storage arrays 105 in this embodiment, other types of targets can be used in other embodiments. In some embodiments, each of the ports more particularly comprises a front-end adaptor of the storage arrays 105, although the term "port" as used herein is intended to be broadly construed and should not be viewed as being limited to front-end adapters. Additional examples of detection of IO operation failures and path availability updates are described below in conjunction with the flow diagrams of FIGS. 2, 5 and 6.

In the FIG. 1 embodiment, the storage arrays 105 comprise a plurality of storage controllers 108. Additional components not explicitly shown in the figure, such as one or more storage caches, may also be provided in the storage arrays 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising one or more host devices, a CTA and at least one storage system. The storage system in this embodiment is assumed to comprise at least one storage array having a plurality of storage devices. The storage devices can include logical storage volumes or other types of logical storage devices.

The steps of the FIG. 2 process are illustratively performed at least in part by, primarily by or under the control of an MPIO layer of a given host device, such as the MPIO driver 112-1 of host device 102-1 of system 100, or primarily by or under the control of an MPIO layer of CTA 140, such as the MPIO driver 142 of system 100, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1, or by the path selection logic 144 of the MPIO driver 142.

Referring to FIG. 2, an MPIO driver (e.g., MPIO driver 112-1 or 142) is configured to control delivery of IO operations from a processing device (e.g., host device 102 or CTA 140) to a storage system (e.g., one or more of the storage arrays 105) over selected ones of a plurality of paths through a network (e.g., network 104). The paths are associated with respective initiator-target pairs wherein each of a plurality of targets of the initiator-target pairs comprises a corresponding port of the storage system.

In step 200, the MPIO driver creates a plurality of IO operation threads (e.g., read and write threads). In creating the plurality of IO operation threads, the MPIO driver is configured to determine a number of the plurality of IO operation threads based on a number of the plurality of targets. For example, the number of IO operation threads is limited to a globally configured value tied to the number of targets, such as, for example, 3, 4 or 5 read threads and 3, 4 or 5 write threads per target. As noted above, in connection with FIG. 4, the device (e.g., host device 102 or CTA 140) can be configured to receive an input from a user specifying the plurality of targets.

In step 202, the MPIO driver uses a given IO operation thread of the plurality of IO operation threads to retrieve a given IO operation from an IO queue (e.g., one of IO queues 110 and 141). The given IO operation may be, for example, an archiving operation comprising a read operation of a snapshot from the storage system and transmission of the snapshot to a cloud storage platform over the network. Alternatively, the given IO operation is a restoring operation comprising a write operation of a snapshot from a cloud storage provider to the storage system. As explained further herein, a given IO operation is for a part of a larger portion of data that has been parsed or divided into smaller portions or chunks. For example, a given IO operation specifies how much offset (e.g., number of bytes) of a data portion to read or write.

In step 204, the MPIO driver attempts to perform the given IO operation on a given target of the plurality of targets. In step 206, the given IO operation is returned to the IO queue upon a failure to perform the given IO operation. The failure to perform the given IO operation is due to a failure of the given target, such as when the target becomes non-operational due, for example, to some problem associated with the functionality of the target. When a given target fails/malfunctions, the MPIO driver is configured to temporarily eliminate from consideration in a path selection algorithm of the MPIO driver any of the paths that are associated with the given target. Once the given target again becomes operational, and the MPIO driver determines that the given target is operational, the MPIO driver can reverse the temporary elimination from consideration in the path selection algorithm of any of the paths that are associated with the given target. According to an embodiment, the reversal is performed after completion of the given IO operation. For example, if a target fails during an IO operation, and is subsequently restored (e.g., becomes operational) during that same IO operation, the MPIO driver will not use that target again (e.g., reverse the temporary elimination) until the IO operation has been completed.

Following the returning of the given IO operation to the IO queue, the MPIO driver is further configured to use another given IO operation thread of the plurality of input-output operation threads to again retrieve the given IO operation from the IO queue, and then attempt to perform the given IO operation on another given target of the plurality of targets.

Prior to returning the given IO operation to the IO queue, the MPIO driver determines whether a remaining number of the plurality of IO threads is greater than one IO operation thread. If the remaining number of IO threads is less than or equal to one, then the IO operation fails without returning the given IO operation to the IO queue, and without attempting to perform the given IO operation on another target.

According to an embodiment, the given IO operation corresponds to one of a plurality of smaller IO operations resulting from dividing IO operations into smaller subsets (e.g., chunks). Following the creation of the IO operation threads, the MPIO driver divides a plurality of IO operations into the plurality of smaller IO operations, provides the plurality of smaller IO operations to the plurality of IO operation threads, and uses the IO operation threads to add the smaller IO operations to the IO queue.

The operation of the information processing system 100 will now be described in further detail with reference to the flow diagram of the illustrative embodiment of FIG. 5. The process as shown includes steps 500 through 518, and is suitable for use in the system 100 but is more generally applicable to other types of systems comprising one or more host devices, a CTA and at least one storage system. The storage system in this embodiment is assumed to comprise at least one storage array having a plurality of storage devices. The storage devices can include logical storage volumes or other types of logical storage devices.

Referring to FIG. 5, a flow diagram of a multi-path read operation is shown. In step 500, an MPIO driver (e.g., MPIO driver 112-1 or 142) identifies selected targets. Referring to FIG. 4, the selected targets can be based on an input from a user specifying the targets to be used. Step 500 also includes the creation of a plurality of MPIO read threads. Similar to step 200 in FIG. 2, in creating the plurality of read threads, the MPIO driver is configured to determine a number of the plurality of read threads based on a number of the plurality of targets. For example, the number of read threads is a globally configured value tied to the number of selected targets. In step 502, the plurality of read threads respectively attempt to connect to their corresponding targets, and in step 504, each MPIO read thread attempts to login to its corresponding target to which it is connected. For example, if the globally configured value is 3 read threads per target, each group of 3 read threads attempts to connect to and login to their corresponding target of the respective targets. In the case of 3 selected targets, for example, 9 read threads are created. Of the 9 read threads, 3 read threads will attempt to connect to and log in to a first target, another 3 read threads will attempt to connect to and login to a second target, and a final 3 read threads will attempt to connect to and log in to a third target. If connecting or logging in fails for a read thread at step 502 or step 504, the process proceeds to step 518, where the read thread exits the process.

According to an embodiment, in step 506, the MPIO driver executes a main parser (e.g., data_process) to divide larger portions of data into smaller portions or chunks to read. For example, a metadata parser specifies how much offset (e.g., number of bytes) of a data portion to read. According to an embodiment, a chunk comprises a tuple including an offset, length, and data to read. The main parser (e.g., metadata parser) is a function including logic to create read chunks out of a SnapDiff of a snapshot, and provide the read chunks to the read threads. A SnapDiff engine identifies new, changed, renamed and/or deleted files between two snapshots. The divided data portions (also referred to herein as "data items") that are to be read are provided to the read threads by the metadata parser. Initially, the larger portions of the data to be read (e.g., snapshots) can be specified by, for example, users or applications running on one or more of the host devices 102.

In step 508, each of the read threads add their read data items, which were received from the main parser, to a read queue (e.g., IO queue 110 or 141). The read data items are not the data itself, but are a representative specification of the data item to be read (e.g., the IO operation to be performed). According to an embodiment, a read thread does not maintain multiple read data items that are to be read. In other words, a read thread does not maintain multiple IO chunks, and each thread provides a single IO chunk to the read queue at a given time.

Then, in step 510, the MPIO read threads will attempt to retrieve a queued item from the read queue so that an IO operation (in this case, a read operation) can be performed for that data item. It is possible that a given read thread may retrieve one of the data items that it placed in the read queue, or a data item which was provided to the read queue by another read thread.

In step 512, the MPIO driver determines whether a given read thread has retrieved the data item from the read queue. If the item has not been retrieved, the MPIO driver determines in step 516 if there are any more data items to be retrieved from the read queue. If the read queue is empty, and there are no more data items to be retrieved, in step 518, the read thread stops attempting to retrieve queued items and exits the process. If, at step 516, it is determined that there are still items in the read queue, the read thread again attempts to retrieve a queued data item from the read queue at step 510. A read thread will continue to perform IO operations as long as the read thread continues to receive read items from the main parser, or the thread will exit the process if an end of data flag is set.

At step 512, if the data item has been retrieved from the read queue, then, at step 514, the read thread attempts to perform the read operation for the data item via the target on one of the storage arrays 105 to which the read thread is connected and logged in. In the event the read operation is successful at step 514, the thread returns to step 506 to receive more read items from the main parser to be added to the thread. In the event the read operation fails at step 514, this may be due a failure of the target associated with the current read thread. Following a failure at step 514, there are two routes through which the process can proceed. In the first route, when the read thread count is greater than 1 (meaning there is at least 1 remaining read thread other than the current read thread), the current read thread puts the data item back in the read queue at step 515, so that another read thread corresponding to a different and operational target can attempt to retrieve the queued item at step 510, and subsequently perform the read operation for that data item via its corresponding target. If the other read thread is connected to an operational target different from the target corresponding to the read thread in which the read operation failed, then fault tolerance is achieved by allowing the read operation to be tried on a different target, and potentially be successful. Alternatively, if the other read thread is connected to the same target as that of the previous read thread corresponding to the failed read operation, the read operation for the other read thread may also fail if there is a problem with the target, or if the problem was not with the target, and has since been remedied, the read operation for the other read thread may be successful. Following the return of the data item to the read queue in step 515, the read thread that returned the data item stops attempting to retrieve queued items and exits the process.

In the second route following a failure of the read operation at step 514, if the read thread count is less than or equal to 1, this means that the current read thread is the only remaining read thread. As a result, no other read thread corresponding to a different and operational target is available to attempt to retrieve the queued item and subsequently perform the read operation for that data item. In this case, the item is not placed back in the read queue, and the read thread stops attempting to retrieve queued items and exits the process (step 518).

The operation of the information processing system 100 will now be described in further detail with reference to the flow diagram of the illustrative embodiment of FIG. 6. The process as shown includes steps 600 through 618, and is suitable for use in the system 100 but is more generally applicable to other types of systems comprising one or more host devices, a CTA and at least one storage system. The storage system in this embodiment is assumed to comprise at least one storage array having a plurality of storage devices. The storage devices can include logical storage volumes or other types of logical storage devices.

Referring to FIG. 6, a flow diagram of a multi-path write operation is shown. In step 600, an MPIO driver (e.g., MPIO driver 112-1 or 142) identifies selected targets. Referring to FIG. 4, the selected targets can be based on an input from a user specifying the targets to be used. Step 600 also includes the creation of a plurality of MPIO write threads. Similar to step 200 in FIG. 2, in creating the plurality of write threads, the MPIO driver is configured to determine a number of the plurality of write threads based on a number of the plurality of targets. For example, the number of write threads is a globally configured value tied to the number of selected targets. In step 602, the plurality of write threads respectively attempt to connect to their corresponding targets, and in step 604, each MPIO write thread attempts to log in to its corresponding target to which it is connected. For example, if the globally configured value is 3 write threads per target, each group of 3 write threads attempts to connect to and log in to their corresponding target of the respective targets. In the case of 3 selected targets, for example, 9 write threads are created. Of the 9 write threads, 3 write threads will attempt to connect to and log in to a first target, another 3 write threads will attempt to connect to and login to a second target, and a final 3 write threads will attempt to connect to and log in to a third target. If connecting or logging in fails for a write thread at step 602 or step 604, the process proceeds to step 618, where the write thread exits the process.

According to an embodiment, in step 606, the MPIO driver executes a main parser (e.g., data_process) to divide larger portions of data into smaller portions or chunks to write. For example, a metadata parser specifies how much offset (e.g., number of bytes) of a data portion to write. According to an embodiment, a chunk comprises a tuple including an offset, length, and data to write. The main parser (e.g., metadata parser) is a function including logic to create write chunks out of a SnapDiff of a snapshot, and provide the write chunks to the write threads. A SnapDiff engine identifies new, changed, renamed and/or deleted files between two snapshots. The divided data portions (also referred to herein as "data items") that are to be written are provided to the write threads by the metadata parser. A write thread may include multiple write data items that are to be written. Initially, the larger portions of the data to be written (e.g., snapshots) can be specified by, for example, users or applications running on one or more of the host devices 102.

In step 608, each of the write threads add their write data items, which were received from the main parser, to a write queue (e.g., IO queue 110 or 141). The write data items are not the data itself, but are a representative specification of the data item to be written (e.g., the IO operation to be performed). According to an embodiment, a write thread does not maintain multiple write data items that are to be written. In other words, a write thread does not maintain multiple IO chunks, and each thread provides a single IO chunk to the write queue at a given time.

Then, in step 610, the MPIO write threads will attempt to retrieve a queued item from the write queue so that an IO operation (in this case, a write operation) can be performed for that data item. It is possible that a given write thread may retrieve one of the data items that it placed in the write queue, or a data item which was provided to the write queue by another write thread.

In step 612, the MPIO driver determines whether a given write thread has retrieved the data item from the write queue. If the item has not been retrieved, the MPIO driver determines in step 616 if there are any more data items to be retrieved from the write queue. If the write queue is empty, and there are no more data items to be retrieved, in step 618, the write thread stops attempting to retrieve queued items and exits the process. If, at step 616, it is determined that there are still items in the write queue, the write thread again attempts to retrieve a queued data item from the write queue at step 610. A write thread will continue to perform IO operations as long as the write thread continues to receive write items from the main parser, or the thread will exit the process if an end of data flag is set.

At step 612, if the data item has been retrieved from the write queue, then, at step 614, the write thread attempts to perform the write operation for the data item via the target on one of the storage arrays 105 to which the write thread is connected and logged in. In the event the write operation is successful at step 614, the thread returns to step 606 to receive more write items from the main parser to be added to the thread. In the event the write operation fails at step 614, this may be due a failure of the target associated with the current write thread. Following a failure at step 614, there are two routes through which the process can proceed. In the first route, when the write thread count is greater than 1 (meaning there is at least 1 remaining write thread other than the current write thread), the current write thread puts the data item back in the write queue at step 615, so that another write thread corresponding to a different and operational target can attempt to retrieve the queued item at step 610, and subsequently perform the write operation for that data item via its corresponding target. If the other write thread is connected to an operational target different from the target corresponding to the write thread in which the write operation failed, then fault tolerance is achieved by allowing the write operation to be tried on a different target, and potentially be successful. Alternatively, if the other write thread is connected to the same target as that of the previous write thread corresponding to the failed the write operation, the write operation for the other write thread may also fail if there is a problem with the target, or if the problem was not with the target, and has since been remedied, the write operation for the other write thread may be successful. Following the return of the data item to the write queue in step 615, the write thread that returned the data item stops attempting to retrieve queued items and exits the process.

In the second route following a failure of the write operation at step 614, if the write thread count is less than or equal to 1, this means that the current write thread is the only remaining write thread. As a result, no other write thread corresponding to a different and operational target is available to attempt to retrieve the queued item and subsequently perform the write operation for that data item. In this case, the item is not placed back in the write queue, and the write thread stops attempting to retrieve queued items and exits the process.

The steps of the FIGS. 2, 5 and 6 processes are shown in sequential order for clarity and simplicity of illustration only, and certain steps can at least partially overlap with other steps. Also, one or more of the steps referred to as being performed by a particular system component, such as an MPIO layer, can in other embodiments be performed at least in part by one or more other system components.

As indicated above, different instances of the FIGS. 2, 5 and 6 processes can execute at least in part in parallel with one another for different devices. Also, multiple additional instances of the FIGS. 2, 5 and 6 processes can be performed in respective ones of one or more additional host devices or CTAs that share the storage array.

The particular processing operations and other system functionality described in conjunction with the flow diagrams of FIGS. 2, 5 and 6 are presented by way of illustrative example only, and should not be construed as limiting the scope of the disclosure in any way. Alternative embodiments can use other types of processing operations involving host devices, storage systems, CTAs and functionality for using multiple storage targets to execute threads for reading and writing snapshots in block archiving or restoring processes. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different block archiving or restoring arrangements within a given information processing system. Further, additional steps including, but not necessarily limited to, unit testing before IO operations ("testunitReady"), logging on/off from targets and target threads, connecting/disconnecting from targets and target threads, destroying target threads, keeping alive to be sent commands for logged in target threads ("nop_out") and returning read capacity may be included in the processing operations.

Functionality such as that described in conjunction with the flow diagrams of FIGS. 2, 5 and 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The above-described functions associated with execution of multiple read and write threads to read and write snapshots on multiple storage targets are illustratively carried out at least in part utilizing the MPIO driver 112-1 and its path selection logic 114-1, or the MPIO driver 142 and its path selection logic 144. For example, in some embodiments, the reading and writing of block snapshots using multiple storage targets can be implemented substantially entirely under the control of the MPIO driver 112-1 or MPIO driver 142, and in such embodiments, the MPIO driver 112-1 or MPIO driver 142 is illustratively configured to control performance of certain steps of the flow diagrams as described above in conjunction with FIGS. 2, 5 and 6. Additional or alternative device components, such as block archiving/restoring control logic implemented in the host device or CTA 140, can be used to control performance of a block archiving or restoring processes such as those of FIGS. 2, 5 and 6.

It is assumed that each of the other MPIO drivers 112 is configured in a manner similar to that described above and elsewhere herein for the first MPIO driver 112-1 and MPIO driver 142. The other host devices 102 of the system 100 are therefore also configured to communicate over the network 104 with the storage array 105, the cloud storage platform 130 and/or the CTA 140. The MPIO drivers 112 of such other host devices are each similarly configured to deliver IO operations from their corresponding one of the sets of IO queues 110 to the storage array 105 over selected paths through the network 104, and to perform the disclosed functionality for using multiple storage targets to execute threads for reading and writing snapshots in block archiving or restoring processes.

Accordingly, block archiving or restoring functionality described above in the context of the first MPIO driver 112-1 and the first host device 102-1, is assumed to be similarly performed by each of the other MPIO drivers 112-2 through 112-N and/or more generally by their respective host devices 102-2 through 102-N. Alternatively, the host devices 102 communicate with the CTA 140, which performs block archiving or restoring functions using MPIO driver 142. In these embodiments, the IO queues 110, MPIO drivers 112 and path selection logic 114 may be omitted from the host devices 102, and reside solely in the CTA 140.

The MPIO drivers 112 and 142 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support execution of multiple read and write threads to read and write snapshots on multiple storage targets.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, CTA 140, sets of IO queues 110, 141, MPIO drivers 112, 142, instances of path selection logic 114, 144 and cloud storage platforms 130 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of block archiving/restoring control logic implemented in the host devices 102, CTA 140 and the storage arrays 105 can be used to perform at least portions of the block archiving or restoring functionality.

Figure 7:
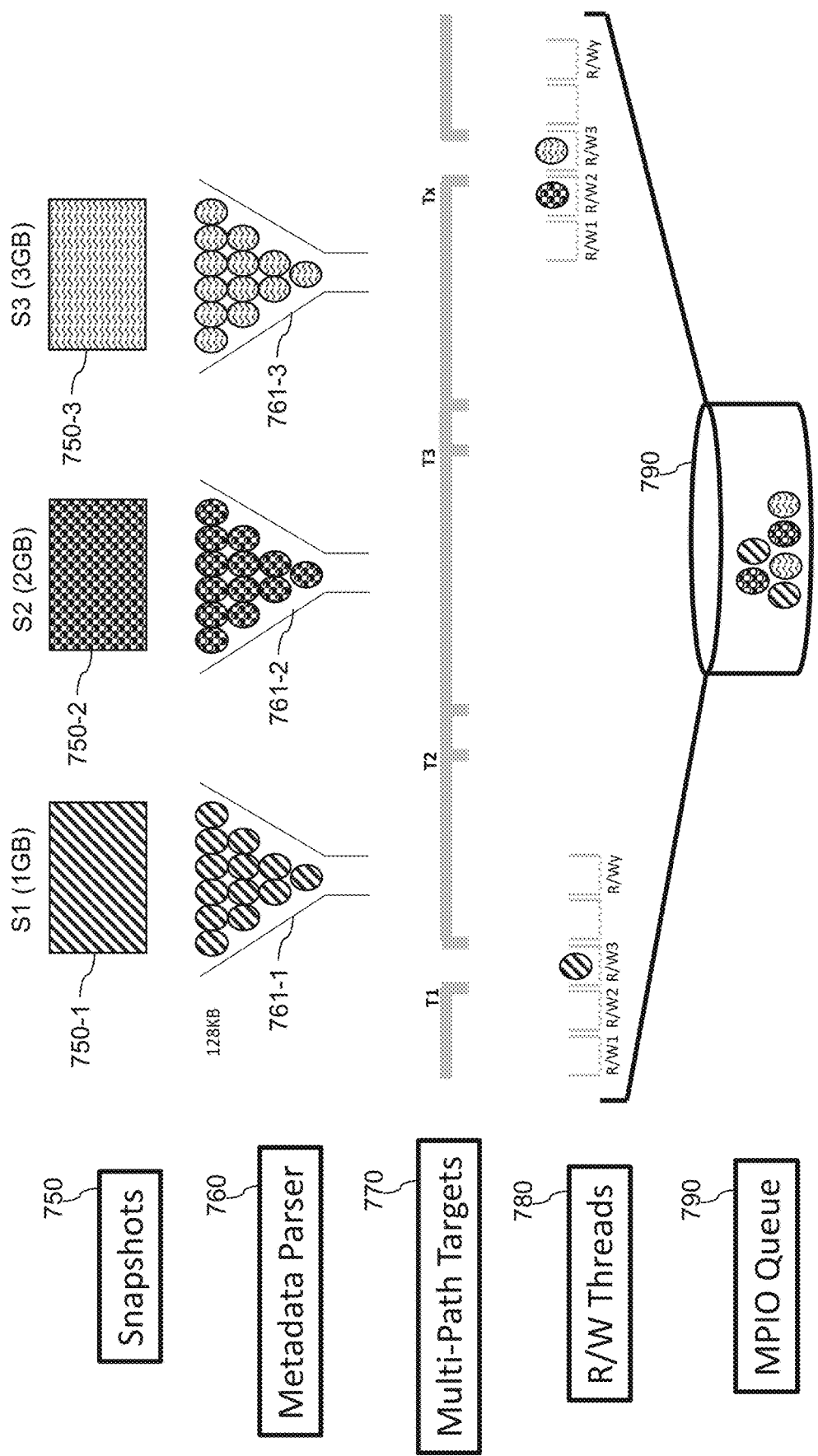
FIG. 7 is a conceptual diagram illustrating parsing of snapshots into smaller IO portions and provisioning of the IO portions to IO threads and an IO queue based on active targets in an illustrative embodiment.

Referring to the conceptual diagram in FIG. 7, in a non-limiting illustrative example, larger portions of the data to be read or written comprise snapshots 750. The snapshots 750 include, for example, a first snapshot 750-1 (S1), a second snapshot 750-2 (S2) and a third snapshot (S3) 750-3 having sizes of 1 GB, 2 GB and 3 GB, respectively, collectively referred to herein as snapshots 750. As explained herein above, a metadata parser 760 divides the snapshots 750 into smaller IO portions (e.g., the IO data chunks or data items described herein above). The IO data items are shown in respective parsed groups 761-1, 761-2 and 761-3, collectively referred to herein as groups 761, including the data items represented as patterned circles. Each data item can be, for example, 128 KB, but the embodiments are not limited thereto.

As explained herein, the divided data portions (e.g., data items) that are to be read or written are provided to the read or write threads (R/W threads) 780 by the metadata parser 760. Each of the R/W threads 780 threads adds their data items, which were received from the metadata parser 760, to an MPIO queue 790 (e.g., IO queue 110 or 141). As can be seen, the R/W threads 780 correspond to selected targets T1 and Tx of a plurality of multi-path targets 770 of one or more storage arrays, where x corresponds to the total number of targets. For example, as explained in connection with FIG. 4, a user may select targets to be used in connection with the IO operations. In the example in FIG. 7, two of a plurality of targets were selected, and as per a predetermined configuration, y number of R/W threads are created for each of the selected targets. In the illustrated example, R/W3 corresponding to target T1 includes a data item from the first snapshot 751-1 and R/W2 and R/W3 corresponding to target Tx include data items from the second and third snapshots 751-2 and 751-3, which were provided to the R/W threads by the metadata parser 760. The R/W threads put the data items in MPIO queue 790, and attempt to retrieve items from MPIO queue 790 to perform read or write operations for the data items. Once a thread retrieves an item, the item will be removed from the queue 790, and a read or write operation will be performed on the target the thread is logged in to. A successful or failed read or write operation will follow the flow as set forth in FIG. 5 or FIG. 6.

Figure 8:
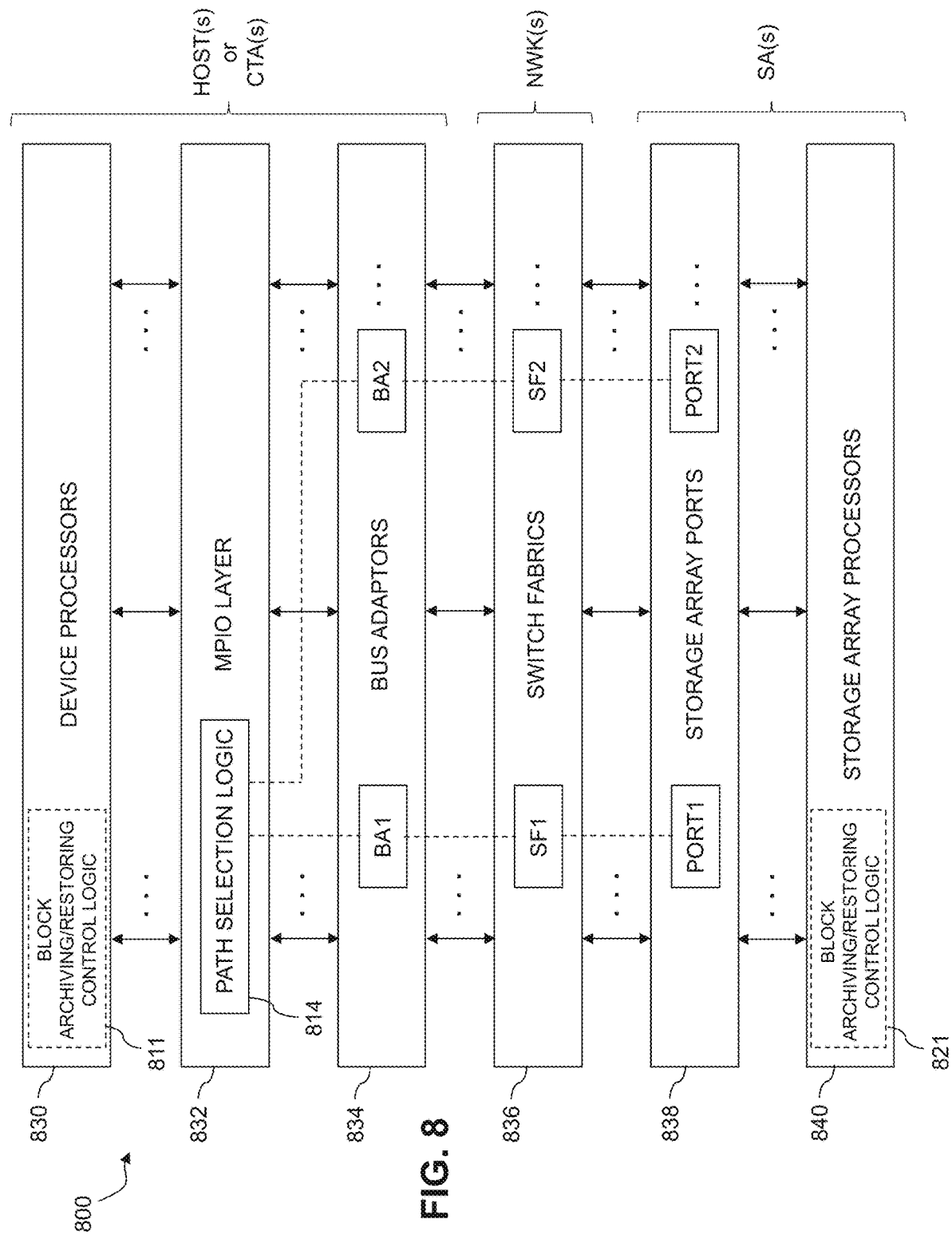
FIG. 8 is a block diagram showing multiple layers of a layered system architecture that includes a multi-path layer with functionality for using multiple storage targets to execute threads for reading and writing snapshots in an illustrative embodiment.

Referring now to FIG. 8, another illustrative embodiment is shown. In this embodiment, an information processing system 800 comprises one or more instances of host-side or CTA-side block archiving/restoring control logic 811, path selection logic 814 and storage-side block archiving/restoring control logic 821. The system 800 is configured in accordance with a layered system architecture that illustratively includes a device processor layer 830, an MPIO layer 832, a BA layer 834, a switch fabric layer 836, a storage array port layer 838 and a storage array processor layer 840. As illustrated in the figure, the device processor layer 830, the MPIO layer 832 and the BA layer 834 are associated with one or more host devices or a CTA, the switch fabric layer 836 is associated with one or more SANs or other types of networks, and the storage array port layer 838 and storage array processor layer 840 are associated with one or more storage arrays ("SAs"). The system 800 in this embodiment implements block archiving or restoring functionality using multiple storage targets to execute threads for reading and writing snapshots. The block archiving or restoring functionality in this embodiment is assumed to be controlled at least in part by host-side or CTA-side block archiving/restoring control logic 811, path selection logic 814 of the MPIO layer 832, and storage-side block archiving/restoring control logic 821, although other arrangements are possible.

The host-side or CTA-side block archiving/restoring control logic 811 implemented in the device processor layer 830 controls host-based or CTA-based block archiving or restoring processes of the system 800. The block archiving/restoring control logic 811 can include multiple distinct block archiving/restoring control logic instances for respective ones of a plurality of host devices or a CTA of the system 800.

The storage-side block archiving/restoring control logic 821 implemented in the storage array processor layer 840 controls storage-based block archiving or restoring processes of the system 800. The block archiving/restoring control logic 821 can include multiple distinct block archiving/restoring control logic instances for respective ones of a plurality of storage arrays of the system 800.

The host-side or CTA-side and storage-side block archiving/restoring control logic 811 and 821 are illustratively configured to implement at least portions of the functionality for using multiple storage targets to execute threads for reading and writing snapshots as disclosed herein. These components are shown in dashed outline in the figure, as they can be implemented in different locations within the system 800, or in a distributed manner across multiple locations. For example, the host-side or CTA-side block archiving/restoring control logic 811, although illustratively shown as part of the device processor layer 830, can be implemented at least in part in the MPIO layer 832. As another example, the storage-side block archiving/restoring control logic 821, although illustratively shown as part of the storage array processor layer 840, can be implemented at least in part in the storage array port layer 838.

The MPIO layer 832 is an example of what is also referred to herein as a multi-path layer, and comprises one or more MPIO drivers implemented in respective host devices or in the CTA. Each such MPIO driver illustratively comprises an instance of path selection logic 814 configured to perform path selection for delivery of IO operations to the storage arrays of system 800 as previously described. The path selection logic 814 in some embodiments operates in conjunction with the host-side or CTA-side and storage-side block archiving/restoring control logic 811 and 821 in implementing at least portions of the functionality for using multiple storage targets to execute threads for reading and writing snapshots in block archiving or restoring processes as disclosed herein. Additional or alternative layers and path selection logic arrangements can be used in other embodiments.

In the system 800, path selection logic 814 is configured to select different paths for sending IO operations from a given host device or CTA to a storage array. These paths as illustrated in the figure include a first path from a particular BA denoted BA1 through a particular switch fabric denoted SF1 to a particular storage array port denoted PORT1, and a second path from another particular BA denoted BA2 through another particular switch fabric denoted SF2 to another particular storage array port denoted PORT2.

These two particular paths are shown by way of illustrative example only, and in many practical implementations there will typically be a much larger number of paths between the one or more host devices or CTA and the one or more storage arrays, depending upon the specific system configuration and its deployed numbers of BAs, switch fabrics and storage array ports. For example, each host device or CTA in the FIG. 8 embodiment can illustratively have a set of n paths to a shared storage array, or alternatively different ones of the host devices or CTA can have different numbers and types of paths to the storage array.

The path selection logic 814 of the MPIO layer 832 in this embodiment therefore selects paths for delivery of IO operations to the one or more storage arrays having the storage array ports of the storage array port layer 838. In selecting the paths, the path selection logic 814 utilizes path availabilities determined based at least in part on selected targets, and the success or failure of IO operation threads (e.g., read or write threads) to implement reading or writing data of data items. For example, some paths may be available because their respective targets are currently in a non-failed state, while other paths are not available because their respective targets are currently in a failed state.

In this illustrative embodiment, the host devices or CTA and the storage array of system 800, through their respective MPIO drivers and respective instances of block archiving/restoring control logic 811 and 821 provide functionality for using multiple storage targets to execute threads for reading and writing snapshots in block archiving or restoring processes, possibly with involvement of other host devices, CTAs or system components, such as path selection logic 814 of MPIO layer 832.

Some implementations of the system 800 can include a relatively large number of host devices (e.g., 1000 or more host devices), although as indicated previously different numbers of host devices, and possibly only a single host device, may be present in other embodiments. Some implementations of the system 800 can include more than one CTA. Each of the host devices and CTAs is typically allocated with a sufficient number of BAs to accommodate predicted performance needs. In some cases, the number of BAs per host device or CTA is on the order of 4, 8 or 16 BAs, although other numbers of BAs could be allocated to each host device or CTA depending upon the predicted performance needs. A typical storage array may include on the order of 128 ports, although again other numbers can be used based on the particular needs of the implementation. The number of host devices per storage array port in some cases can be on the order of IO host devices per port. The BAs of the host devices and CTAs are assumed to be zoned and masked to the storage array ports in accordance with the predicted performance needs, including user load predictions.

A given host device or CTA of system 800 can be configured to initiate an automated path discovery process to discover new paths responsive to updated zoning and masking or other types of storage system reconfigurations performed by a storage administrator or other user. For certain types of host devices or CTAs, such as host devices or CTAs using particular operating systems such as Windows, ESX or Linux, automated path discovery via the MPIO drivers of a multi-path layer is typically supported. Other types of host devices or CTAs using other operating systems such as AIX in some implementations do not necessarily support such automated path discovery, in which case alternative techniques can be used to discover paths.

As indicated previously, absent use of the techniques for using multiple storage targets to execute threads for reading and writing snapshots as disclosed herein, performance of the storage system in processing IO requests received from a host device or CTA can be adversely impacted when IO operations are performed on a single storage target (e.g., iSCSI target). If a designated target fails during a task run, the task fails. A second problem with current architectures is a failure to use all available IO paths. For example, a chosen target may be already overloaded and may result in slow performance of IO operations.

Such drawbacks are advantageously overcome in illustrative embodiments herein by implementing an MPIO driver to process IO operations of a host device and/or of a CTA by using IO operation threads to log in to multiple storage targets and retrieve IO operations from IO queues. If a target fails for a given IO operation thread, an IO operation is returned to an IO queue and retrieved by another IO operation thread to attempt the IO operation on a different target.

The illustrative embodiments disclosed herein can provide a number of significant advantages relative to conventional arrangements. For example, if a target fails, IO operations are able to be performed in other operational targets, thereby providing fault tolerance and load sharing. The embodiments advantageously use MPIO to achieve high availability by enabling threads connected to operational targets to obtain data items that have been returned to an IO queue, and cause IO operations to be performed on those data items in connection with the operational targets instead of non-operational targets.

The particular features and functionality of the illustrative embodiments described above can be varied in other embodiments. Also, as mentioned previously, different instances of the above-described algorithms and other functionality for using multiple storage targets to execute threads for reading and writing snapshots in block archiving or restoring processes can be performed by different MPIO drivers in different host devices and/or CTAs.

The particular block archiving or restoring arrangements described above are therefore presented by way of illustrative example only. Numerous alternative arrangements of these and other features can be used in implementing the target failure status detection and path availability update in other illustrative embodiments.

These and other embodiments are applicable to a wide variety of different storage protocols, including, by way of example, iSCSI and other SCSI protocols, and NVMe protocols of various types.

As is apparent from the above, some embodiments herein leverage a multi-path layer of one or more host devices or CTA to provide enhanced performance in processing of IO operations directed to one or more storage arrays or other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Dell® EMC® ECS, AWS®, GCP® and Microsoft® Azure®. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon® S3, GCP® Cloud Storage, and Microsoft® Azure® Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104, storage array 105, cloud storage platforms 130 and CTA 140 are illustratively implemented in the form of software running on one or more processing devices. As a more particular example, the instances of path selection logic 114 or 144 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, block archiving/restoring logic and additional or alternative components. Also, the particular configurations of system and device elements and associated processing operations illustratively shown in the drawings can be varied in other embodiments. For example, a wide variety of different host devices, MPIO drivers, cloud storage platforms, cloud tiering appliances and storage system configurations and associated arrangements for execution of multiple read and write threads to read and write block snapshots on multiple storage targets can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing device comprising a processor coupled to a memory;
the processing device being configured to communicate over a network with a storage system comprising a plurality of storage devices;
the processing device comprising:
a multi-path input-output driver configured to control delivery of input-output operations from the processing device to the storage system over selected ones of a plurality of paths through the network;
the paths being associated with respective initiator-target pairs wherein each of a plurality of targets of the initiator-target pairs comprises a corresponding port of the storage system;
wherein the multi-path input-output driver is further configured:
to create a plurality of input-output operation threads;
to use a given input-output operation thread of the plurality of input-output operation threads to retrieve a given input-output operation from an input-output queue;
to attempt to perform the given input-output operation on a given target of the plurality of targets; and
to return the given input-output operation to the input-output queue upon a failure to perform the given input-output operation.

2. The apparatus of claim 1 wherein the processing device is further configured to perform cloud tiering.

3. The apparatus of claim 1 wherein, following the returning of the given input-output operation to the input-output queue, the multi-path input-output driver is further configured to use another given input-output operation thread of the plurality of input-output operation threads to again retrieve the given input-output operation from the input-output queue.

4. The apparatus of claim 3 wherein the multi-path input-output driver is further configured to attempt to perform the given input-output operation on another given target of the plurality of targets.

5. The apparatus of claim 1 wherein the multi-path input-output driver is further configured to determine whether a remaining number of the plurality of input-output operation threads is greater than one input-output operation thread prior to returning the given input-output operation to the input-output queue.

6. The apparatus of claim 1 wherein the multi-path input-output driver is further configured:
to divide the input-output operations into a plurality of smaller input-output operations; and
provide the plurality of smaller input-output operations to the plurality of input-output operation threads.

7. The apparatus of claim 6 wherein the multi-path input-output driver is further configured to use the plurality of input-output operation threads to add the plurality of smaller input-output operations to the input-output queue.

8. The apparatus of claim 7 wherein the given input-output operation corresponds to one of the plurality of smaller input-output operations.

9. The apparatus of claim 1 wherein the processing device is further configured receive an input from a user specifying the plurality of targets.

10. The apparatus of claim 1 wherein, in creating the plurality of input-output operation threads, the multi-path input-output driver is configured to determine a number of the plurality of input-output operation threads based on a number of the plurality of targets.

11. The apparatus of claim 1 wherein the given input-output operation comprises a read operation of a snapshot from the storage system and transmission of the snapshot to a cloud storage platform over the network.

12. The apparatus of claim 1 wherein the given input-output operation comprises a write operation of a snapshot from a cloud storage provider to the storage system.

13. The apparatus of claim 1 wherein the failure to perform the given input-output operation is due to a failure of the given target, and wherein the multi-path input-output driver is further configured to temporarily eliminate from consideration in a path selection algorithm of the multi-path input-output driver any of the paths that are associated with the given target.

14. The apparatus of claim 13 wherein the multi-path input-output driver is further configured:
   to determine that the given target is operational; and
   to reverse the temporary elimination from consideration in the path selection algorithm of the multi-path input-output driver of any of the paths that are associated with the given target, wherein the reversal is performed after completion of the given input-output operation.

15. A method performed by a processing device configured to communicate over a network with a storage system, comprising:
   configuring a multi-path input-output driver of the processing device to control delivery of input-output operations from the processing device to a storage system over selected ones of a plurality of paths through a network;
   the paths being associated with respective initiator-target pairs wherein each of a plurality of targets of the initiator-target pairs comprises a corresponding port of the storage system;
   the multi-path input-output driver:
   creating a plurality of input-output operation threads;
   using a given input-output operation thread of the plurality of input-output operation threads to retrieve a given input-output operation from an input-output queue;
   attempting to perform the given input-output operation on a given target of the plurality of targets; and
   returning the given input-output operation to the input-output queue upon a failure to perform the given input-output operation;
   wherein the processing device comprises a processor coupled to a memory.

16. The method of claim 15 wherein, following the returning of the given input-output operation to the input-output queue, the multi-path input-output driver uses another given input-output operation thread of the plurality of input-output operation threads to again retrieve the given input-output operation from the input-output queue.

17. The method of claim 16 wherein the multi-path input-output driver attempts to perform the given input-output operation on another given target of the plurality of targets.

18. The method of claim 16 wherein the multi-path input-output driver determines whether a remaining number of the plurality of input-output operation threads is greater than one input-output operation thread prior to returning the given input-output operation to the input-output queue.

19. A computer program product comprising a non-transitory processor-readable storage medium having stored therein program code of one or more software programs, wherein the program code, when executed by a processing device comprising a processor coupled to a memory, the processing device being configured to communicate over a network with a storage system and comprising a multi-path input-output driver, causes the multi-path input-output driver:
   to control delivery of input-output operations from the processing device to the storage system over selected ones of a plurality of paths through the network;
   the paths being associated with respective initiator-target pairs wherein each of a plurality of targets of the initiator-target pairs comprises a corresponding port of the storage system;
   to create a plurality of input-output operation threads;
   to use a given input-output operation thread of the plurality of input-output operation threads to retrieve a given input-output operation from an input-output queue;
   to attempt to perform the given input-output operation on a given target of the plurality of targets; and
   to return the given input-output operation to the input-output queue upon a failure to perform the given input-output operation.

20. The computer program product of claim 19 wherein, following the returning of the given input-output operation to the input-output queue, the program code further causes the multi-path input-output driver to use another given input-output operation thread of the plurality of input-output operation threads to again retrieve the given input-output operation from the input-output queue.

* * * * *